United States Patent [19]
Doan et al.

[11] Patent Number: 5,168,412
[45] Date of Patent: Dec. 1, 1992

[54] SURFACE INTERFERENCE DETECTOR

[76] Inventors: Toan Doan; Arthur Alejandre, both of Colo. Springs, Colo.

[21] Appl. No.: 372,673

[22] Filed: Jun. 28, 1989

[51] Int. Cl.$^5$ .......................... G11B 5/60; G01B 5/28; G01N 27/60
[52] U.S. Cl. ..................................... 360/103; 73/105; 324/454; 360/137
[58] Field of Search ......................... 360/137, 75, 103; 324/454; 73/105

[56] References Cited

U.S. PATENT DOCUMENTS

| | | |
|---|---|---|
| 3,536,994 | 10/1970 | Johnson . |
| 3,659,195 | 4/1972 | Cardozo et al. . |
| 3,720,818 | 3/1973 | Spragg et al. ..................... 73/105 |
| 3,761,905 | 9/1973 | Hollstein, Jr. et al. . |
| 3,774,041 | 11/1973 | Kaneko et al. ..................... 250/563 |
| 4,030,830 | 6/1977 | Holly ..................................... 356/109 |
| 4,084,324 | 4/1978 | Whitehouse ........................ 73/105 |
| 4,126,036 | 11/1978 | Nilan et al. ........................ 73/105 |
| 4,213,331 | 7/1980 | Porter ................................. 73/105 |
| 4,358,738 | 11/1982 | Kahn . |
| 4,452,534 | 6/1984 | Gribanov et al. .................. 356/359 |
| 4,532,802 | 8/1985 | Yeack-Scranton et al. . |
| 4,541,070 | 9/1985 | Musin et al. . |
| 4,635,139 | 1/1987 | Nguyen et al. . |
| 4,754,222 | 6/1988 | Felleisen et al. . |
| 4,795,981 | 1/1989 | Ertingshausen et al. ........... 360/103 |
| 4,812,927 | 3/1989 | Fechner .............................. 360/103 |

FOREIGN PATENT DOCUMENTS

| | | |
|---|---|---|
| 0173614 | 7/1987 | Japan . |
| 62-195511 | 2/1988 | Japan . |
| 0113878 | 5/1988 | Japan ................................. 360/103 |
| 8606865 | 11/1986 | PCT Int'l Appl. ................. 360/103 |
| 1387320 | 10/1975 | United Kingdom . |
| 1406470 | 1/1989 | United Kingdom . |
| 1406470 | 1/1989 | United Kingdom . |

Primary Examiner—A. J. Heinz
Assistant Examiner—Jefferson Evans
Attorney, Agent, or Firm—Fish & Richardson

[57] ABSTRACT

Method and device for detecting interferences between surfaces of cooperating elements, including detecting the impact energy generated by an interference between a first surface and a surface protrusion of a second surface, and detecting a protrusion of interest based upon such impact energy. A preferred embodiment includes integration of an interference signal from a transducer associated with one of the surfaces. The integral is used to compare the seriousness of an interference against an interference energy threshold. Embodiments include a head/disk interference (HDI) detector.

20 Claims, 3 Drawing Sheets

SURFACE INTERFERENCE DETECTOR

BACKGROUND OF THE INVENTION

The present invention relates to surface interference detectors.

Many technologies require working surfaces with a controlled level of surface protrusions. For example, thin film heads are intended to fly over recording disks in very close proximity to the disk surface. A head/disk interference (HDI) occurs when the flying head interferes or impacts with a disk surface protrusion, such as foreign matter on the disk surface or a raised portion of the disk surface. Typical limits on acceptable hard disk surface protrusions are on the order of several microinches.

Disk surface protrusions are conventionally detected with a piezoelectric crystal transducer mounted on a test head flying over the disk of interest. A protrusion which does not extend up to flying height will not generate a transducer signal because it will not interfere with the head. When an HDI occurs, an interference signal is generated by the transducer. If the interference signal exceeds or satisfies a background noise threshold, or some multiple of this signal, then an interference is indicated. Conventional HDI detectors read the peak on the interference signal and employ statistical averaging to achieve an acceptable credence (believability) level. Hence, in practice, a disk is submitted to several revolutions of credence checking in order to verify an interference indication.

SUMMARY OF THE INVENTION

The present invention relates to a method and device for evaluating interferences between respective surfaces of cooperating elements, and for detecting surface protrusions.

In one aspect of the invention, a device is configured (a) to evaluate the impact energy of a transducer sense signal, the signal representing an interference between respective surfaces of cooperating elements of an apparatus under test, and (b) to characterize the interference in view of that evaluation.

Embodiments of this aspect may include the following features: The device further includes an integrator circuit and a qualifier circuit, wherein a segment of the sense signal applied to the integrator is integrated, the resulting integral representing the impact energy of the interference, and the qualifier circuit characterizes the interference energy in response to the integral. The device further ibcludes a pre-qualifier circuit, whereby the device is configured to operate such that if the sense signal satisfies a noise threshold level within the pre-qualifier circuit, then a segment of the sense signal is passed by the pre-qualifier circuit to the integrator circuit, the qualifier circuit being configured to test the integral to see if the integral satisfies an interference energy threshold, and if so, a qualification indication is issued by the qualifier circuit to characterize the interference as an interference of interest. The device further includes a full wave rectifier circuit and a bandpass filter, whereby the sense signal is applied to the rectifier via the filter and the rectifier output is applied to the pre-qualifier circuit. The device is configured wherein the pre-qualifier circuit includes a window enable comparator circuit and a window circuit, the window enable comparator outputting the rectified sense signal, if the signal satisfies the noise threshold, to the window circuit, to cause the sense signal segment to be applied to the integrator circuit. The device is configured wherein the window circuit issues a 20 $\mu$sec segment of the sense signal.

The device further includes an integrator circuit to quantify the impact energy of the sense signal over a given time interval. The device is configured wherein the qualifier circuit includes an interference energy comparator and an interference of interest indicator, the interference energy comparator being disposed to compare the integrator output to the interference energy threshold, and if this threshold is satisfied, to issue an output to the interference of interest indicator which in turn issues the qualification indication. The device is configured wherein the cooperating elements are a flying head and a hard disk, the transducer being coupled to the head. The device is configured wherein the filter passes a frequency range of 100-300 KHz.

In another aspect of the invention, an inteference detection device for use with a sensor, which sensor can detect an interference between respective surfaces of cooperating elements and can emit a sense signal in response to the sensed interference, includes a detector circuit configured for (1) pre-qualifying an interference signal as a candidate interference signal of interest in view of a noise threshold level, and (2) for qualifying the pre-qualified signal as an interference of interest in view of an impact energy threshold.

Embodiments of this aspect may include the following features: The detector circuit is further configured to quantify the energy of the candiate signal and to qualify the interference as an interference of interest in view of that quantified energy. The detector circuit includes a candidate interference pre-qualifier circuit, an integrator circuit, and an interference of interest qualifier circuit, whereby the detector circuit is configured to operate such that a segment of the sense signal which satisfies a noise threshold level is pre-qualified and passed by the pre-qualifier circuit to the integrator circuit, this segment is integrated, and the integrator circuit output is tested by the qualifier circuit to see if it satisfies an interference energy threshold, and if so, an output of the qualifier circuit is issued indicative of a qualified interference of interest between the respective surfaces of the cooperating elements. The device further including a full wave rectifier circuit, whereby the sense signal from the sensor is applied to the rectifier and the rectified output is applied to the window circuit. The device is configured wherein the cooperating elements are a flying head and a hard disk, the transducer being coupled to the head.

In another aspect of the invention, a head/disk interference detection device includes a circuit for evaluating the energy of an interference between a head and disk as such energy is carried by a sense signal from a transducer, and for issuing an HDI detection signal based upon that evaluation.

Embodiments of this aspect may include the following features: The device is configured wherein the circuit includes a full wave rectifier, a window enable comparator, a window timer, an integrator, an interference energy comparator, and an interference of interest indicator, whereby the sense signal is rectified by the rectifier and then applied to the window enable comparator, and if the rectified signal is over a noise threshold, then the window timer issues a windowed interference signal, the integrator integrating the windowed signal and the integral thereof being applied to the interference energy comparator, this comparator causing the interference of interest indicator to issue an interference indication signal if the integral satisfies an interference energy threshold, such interference indication signal being availed to indicate an HDI between the head and disk. The device further includes a high impedance amplifier and a bandpass filter, the transducer signal being applied to the rectifier via the amplifier and filter. The device is configured wherein the filter passes a frequency range of 100–300 KHz. The device is configured wherein the transducer is coupled to the head and is either piezoelectric or acoustic. The device is configured wherein the windowed interference signal is about 20 μsec.

In another aspect of the invention, a method for characterizing an interference between surfaces of cooperating elements, includes evaluating the energy on a transducer sense signal representing the interference, and characterizing the interference in view of that energy.

In another aspect of the invention, a method for quantifying and qualifying an interference between two cooperating surfaces based upon an interference signal from a transducer asociated with one of the surfaces, the signal generated upon such an interference, includes (a) rectifying the interference signal, (b) issuing a windowed signal of the rectified signal if it satisfies a noise threshold, (c) integrating the windowed signal and presenting an integrated signal which quantifies the interference energy in the interference signal, (d) comparing the integrated signal to an interference energy threshold, and (e) issuing an interference indication if the integrated signal satisfies the detection threshold, so as to qualify the interference as an interference of interest.

Embodiments of these methods may include the feature that the two surfaces are respective surfaces of a flying head and a hard disk and the interference indication indicates a protrusion on the disk, the protrusion at least meeting a minimum energy criterion set by the interference energy threshold.

In another aspect of the invention, in a system having a sensor, which can detect an interference between a flying head and a disk and can emit a sense signal in response to the sensed interference, a method for qualifying a sensed interference as an interference of interest, includes pre-qualifying the sense signal as a candidate interference signal and, based upon a signal segment carrying the impact energy of the sense signal, qualifying the pre-qualified sense signal as an interference of interest.

DETAILED DESCRIPTION OF THE PREFERRED EMBODIMENT

Figure 1:
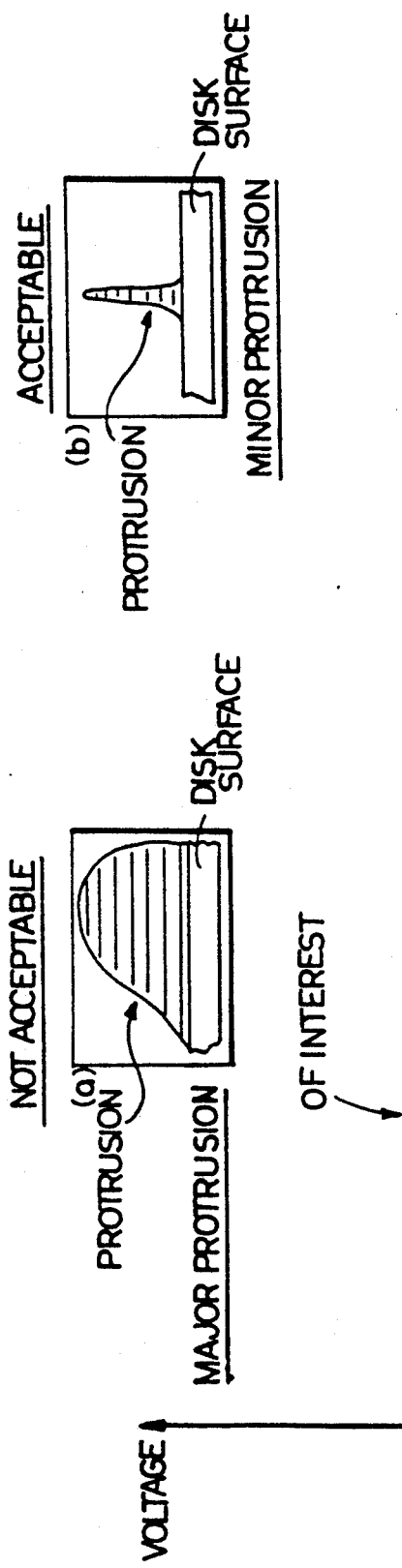
Figure 1:
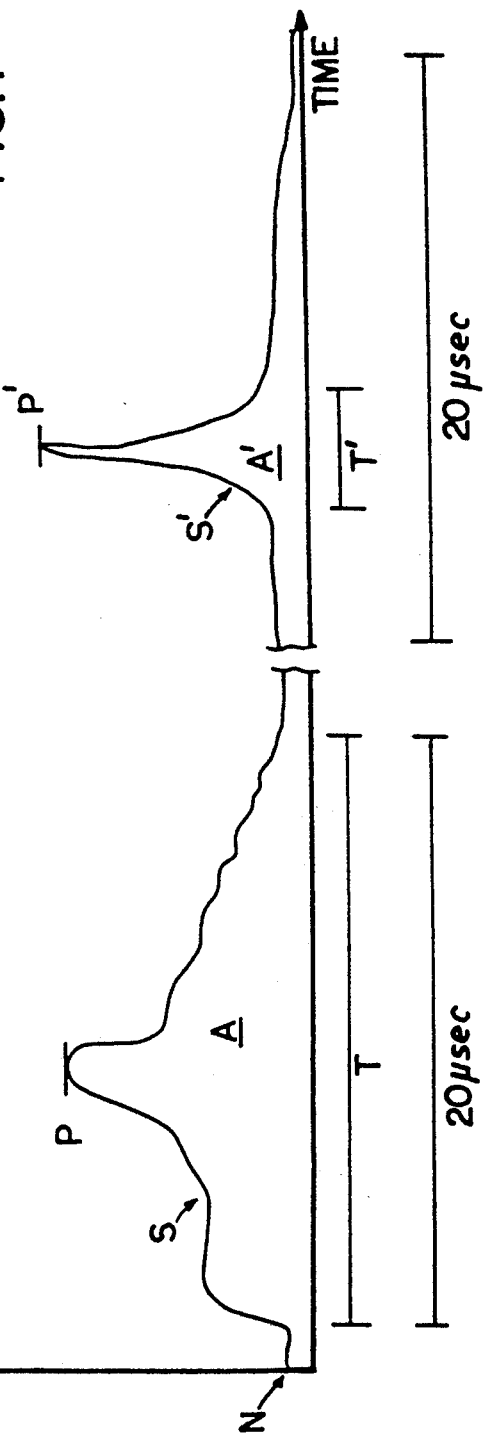
Figure 2:
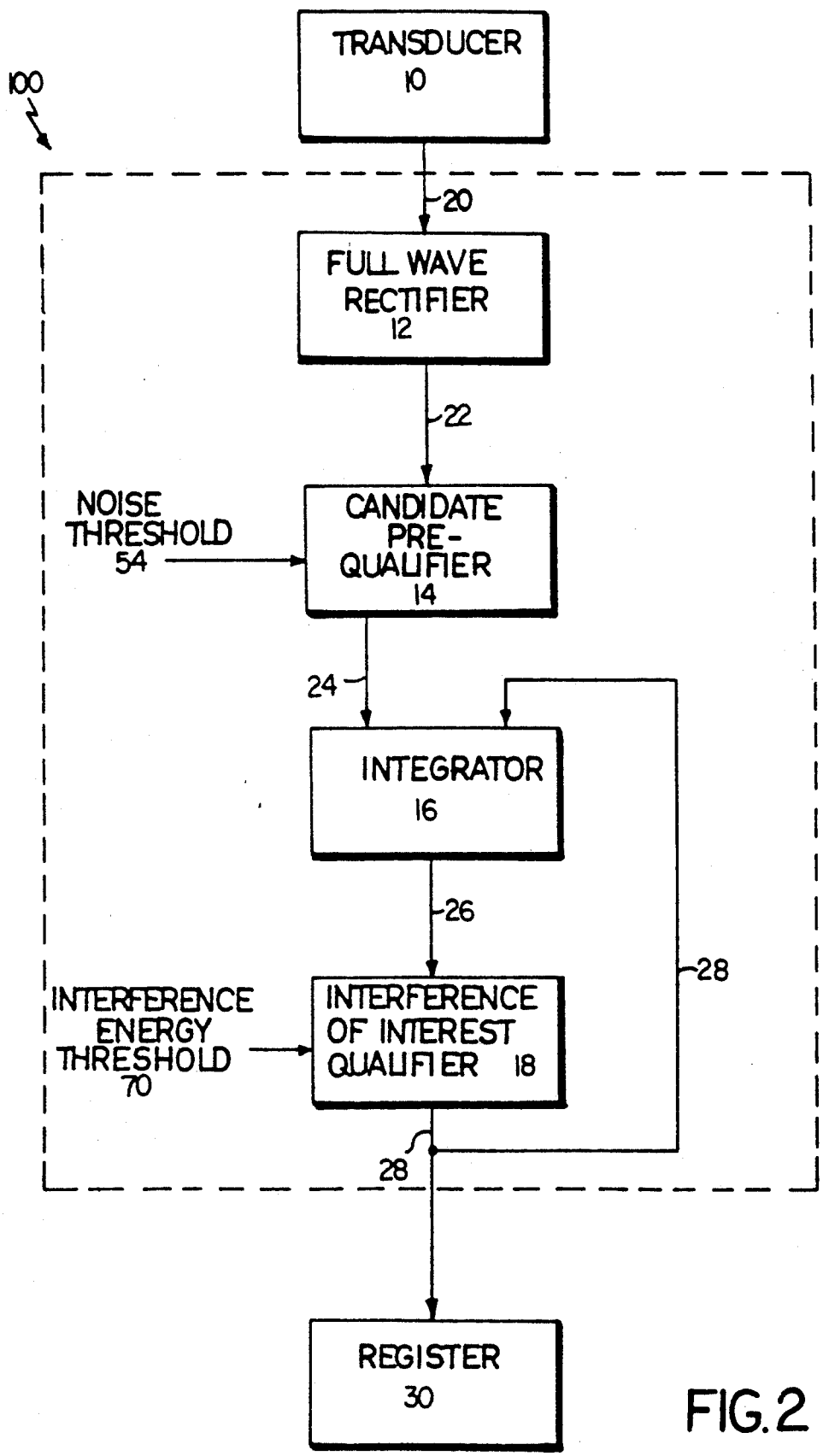
Figure 3:
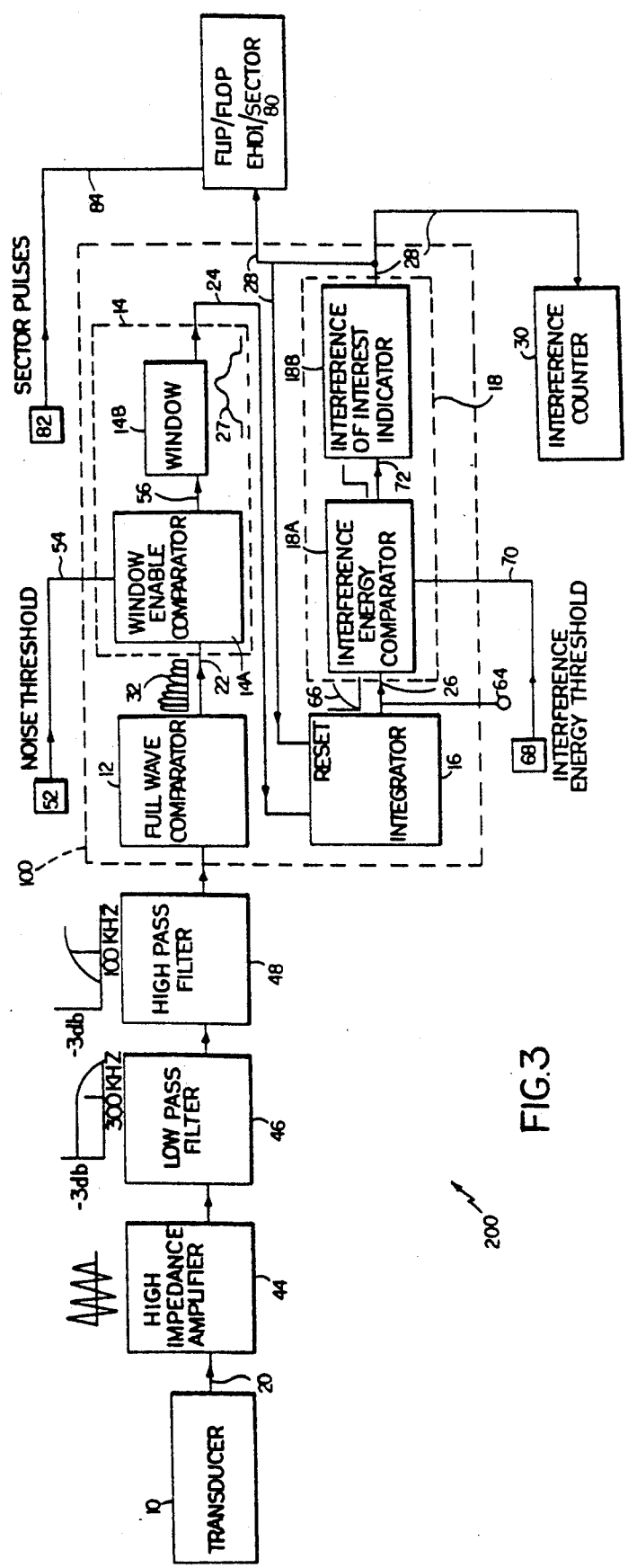

We first briefly describe the drawings:
FIG. 1 is a comparison of two HDI sense signals.
FIG. 2 is a simplified block diagram of the invention.
FIG. 3 is a block diagram of the preferred embodiment of the invention.

We believe that the peaks on an interference signal generated by a transducer on a test device do not carry sufficient information to make a reliable interference detection based upon a single interference reading, or even upon several readings in some cases. A given defect can generate signals with widely varying peaks, while defects of varying character can generate signals with the same or similar peaks. We have recognized, however, that it is possible to accurately evaluate an interference based upon a single interference reading.

We make our determination based upon the impact energy of the interference as sensed by the transducer. (We prefer to use a piezoelectric transducer, but any suitable sensor of impact energy may be used.)

In order to better disclose our invention, we now provide some explanatory matter as applied to detection of protrusions on a hard disk. In particular, FIG. 1 shows two sense signals which might be generated by a respective head/disk interference with two different disk protrusions, see insets (a), (b).

In this example, each protrusion rises up from the disk surface and extends above the head flying height, H,H'. The sense signals are respectively shown as curves S, S', each having a peak P, P', duration T, T', and area A, A'. Curve S is a representation of an HDI caused by a major disk protrusion—inset (a)—of sufficient character, in material density, breadth, mass, etc., to impede accurate use of the disk. This defect is unacceptable and is therefore desired to be detected. Curve S' is a representation of an HDI caused by a minor disk prostrusion—inset (b)—not having sufficient character to impede accurate use of the disk, although of sufficient height to impact with the head. This defect is acceptable and must be distinguished from the first protrusion. The system is shown to have a background noise level N.

The examples of FIG. 1 have been selected to show that the values of peaks P, P' cannot be used to accurately discriminate between these two protrusions, although perhaps each peak tells something about the particular contact event. Even so, the areas A,A' under the curves S,S' are each a direct representation of the sensed energy of the respective HDI, and we believe that the sensed energy can be treated as a direct indicator of the severity of the interference. Hence, since these areas can be quantified, the HDIs can be easily evaluated.

We have determined, by using calibration disks with defects such as to set the lower limit in height and character of unacceptable protrusions (sufficient to prevent accurate use of a disk), that the sensed energy of an HDI in an approximate 20 μsec segment of the transducer signal in our system carries adequate information to enable evaluation of that HDI. (Of course, this window may be adjusted according to particular system characteristics. We chose a 20 μsec window because our piezoelectric transducer signal communicates enough information within this period to enable our desired discrimination/detection process.)

Hence, it becomes possible to discriminate between acceptable and unacceptable sensed protrusions. Furthermore, we have studied defective disks and now realize that we can select an energy standard as will represent the threshold of an acceptable/unacceptable HDI for a given head/disk apparatus. If the area under the curve (representing the sensed energy of interference) is compared against this selected energy standard, then a single HDI reading can be used to accurately identify an HDI as an HDI of interest (thus identifying an unacceptable protrusion).

As seen in the simplified block diagram of FIG. 2, our preferred Energy Head/Disk Interference (EHDI) surface protrusion detector 100 includes a full wave rectifier circuit 12; a candidate pre-qualifier circuit 14; an integrator circuit 16; and an interference of interest qualifier circuit 18.

The full wave rectifier 12 receives sense signal S,S' as output 20 from transducer 10 (associated with a test head flying over a disk of interest) and converts the signal to a positive rectified full wave signal 22. This signal 22 is then applied to candidate pre-qualifier circuit 14. If there are any rectified peaks on signal 22 which satisfy a noise threshold level 54 applied to qualifier circuit 14 (the noise threshold segment being set using a calibration disk), then a 20 μsec segment of the analog, rectified input signal is applied as candidate interference signal 24 from pre-qualifier 14 to integrator 16. The integrator integrates the candidate interference signal 24 and outputs an integrated signal 26. This signal 26 is the integral of signal 24 and is applied to qualifier 18. Qualifier 18 compares this integral (which expresses the area under the curve and represents the sensed HDI impact energy) with an impact energy threshold 70 (which is set using a calibration disk) to determine if an HDI of interest has occurred. If the voltage level of the integral satisfies the present energy threshold voltage level, then qualifier output signal 28 issues to enable interference register 30 to indicate detection of an interference of interest. The qualifier output 28 is also coupled back to reset integrator 16 and window timer 14B in anticipation of the next candidate interference signal 24, since a determination about the present candidate in the integrator has now been made.

As a result of this process, an interference signal from the transducer is qualified and quantified. If the filtered and rectified signal is above a given noise threshold, then it is pre-qualified as a candidate HDI for possible selection as an HDI of interest. If the integral of the candidate interference signal satisfies (e.g., at or above) the interference energy threshold, then it qualifies as an HDI of interest (i.e., an unacceptable impact event). Because we use and can set an impact energy threshold, we can also quantify the impact energy of an interference as being above a preset level. Furthermore, our discrimination process can be made from a single HDI reading.

A preferred embodiment 200 of the present invention is shown in FIG. 3, where the output 20 of transducer 10 (such as a piezoelectric or acoustic transducer) is coupled to the input of our EHDI detector 100 (at the input of full wave rectifier 12) via a high impedance amplifier 44 and a bandpass filter formed from a low pass filter 46 ($-3$ db at 300 KHz) and a high pass filter 48 ($-3$ db at 100 KHz). We employ these filters because we have observed that HDI's of interest in our system occur mostly within the general range of about 100 to 300 KHz. (However, other systems may vary, and this range should be adjusted accordingly.)

The output signal 22 from rectifier 12 (embodying waveform 32) is applied to a first input of window enable comparator 14A of candidate pre-qualifier circuit 14. Noise threshold signal 54 (which we typically set at 20 μVolts) from noise threshold source 52 is applied to a second input of comparator 14A. Comparator 14A outputs input signal 22 is the input satisfies the noise threshold 54. Output 56 of comparator 14A is an analog signal from rectifier 12, and represents a pre-qualified candidate HDI of interest. Output 56 is applied to window timer circuit 14B, which is preferably a 10 μsec one-shot timer. The timer is triggered by and upon receipt of the output of comparator 14A.

The output 24 of the window circuit is preferably a 20 μsec segment of the analog signal 56 from comparator 14A and is applied to a first input of integrator 16. This 20 μsec segment 24 is shown as analog signal 25. Window circuit 14B provides a fast rise and fall time at the leading and trailing edges, respectively, of segment 24. The fast rise time triggers integrator 16, which integrates the analog information on segment 24. The fast fall time resets the integrator at the end of the 20 μsec segment.

After integrator 26 integrates segment 24, the resulting integral (shown as waveform 66) represents the impact energy of the candidate HDI. The output 26 of the integrator is applied to a first input of interference energy comparator 18A of qualifier circuit 18. An interference energy threshold signal 70 from interference energy threshold source 68 is applied to a second input of interference energy comparator 18A. If the voltage of the candidate HDI signal, in the integral form of output 26, satisfies voltage level of threshold 70, then an interference indication signal 72 from comparator 18A is applied to interference of interest indicator 18B, which generates the interference of interest indication output signal 28 of qualifier 18. (Interference indicator 18B is preferably a one-shot timer whose output is set according to circuit requirements, such as at 10 μsec; threshold signal 70 is typically 400–500 μV, normalized for a standard transducer—such as piezoelectric or acoustic—emission when calibrated with a calibrated disk.)

As an example, if a 4 microinch protrusion of a given breadth (such as 15 mils diameter) is determined by experimentation to define the lower limit of unacceptability, then a threshold voltage value 70 is set corresponding to the interference energy level of such a protrusion (by using a calibration disk). If the integrator output satisfies the impact energy threshold signal, then an interference detection signal causes the one shot-timer to generate an interference of interest indication signal. Selection of an actual limit to the height and breadth of an acceptable protrusion is an engineering decision, and is perhaps somewhat arbitrary, depending upon the particular head/disk operating requirements desired of a given system.

The output 28 of indicator 18B is applied to the reset inputs of integrator 16 and of window timer 14B. This reset is appropriate since the present signal in the integrator has been qualified. This reset will prevent the same 20μsec segment from being reintegrated.

A side benefit of the integrator is that it averages out noise on signal 25 for higher reliability; also, test point 64 is provided so that the integral itself can be monitored so as to further study or quantify the HDI impact energy level, such as with a voltmeter, whether or not a particular canidate HDI qualifies further.

Signal 28, as the output of EHDI detector 100, is applied to a first input of interference/sector correlator 80. Correlator 80 also receives sector pulse signals 84 (according to the number of sectors per revolution on the disk) from pulse source 82 so that the location of the qualified HDI can be recorded. Output 28 is also applied to interference counter 30, to tabulate qualified HDIs of interest.

Since the integral expresses the area under the voltage curve for a given interference reading, the integral can be used as a reliable measure of the seriousness of an interference, unlike peak reading. Since a single reading can be considered reliable, this reduces the burden of credence checking substantially. The invention does not require statistical averaging over several retries; however, use of such approach is not foreclosed.

The invention is easily adapted to different products sumply by changing transducers or disks or parameters such as acceptable protrusion height, frequency range, window duration, threshold level, etc.

Other embodiments are within the following claims.

We claim:

1. A surface interference detector device comprising
   (a) evaluation means for receiving a transducer sense signal representing an interference between a flying head and a hard disk under test, the transducer sense signal forming a curve when visually represented and having an area under the curve that represents impact energy of the interference between the head and the disk, and for quantifying the impact energy of the interference between the head and the disk by quantifying the area under the curve formed by the transducer sense signal, and
   (b) characterization means for qualifying the interference in view of the quantified impact energy.

2. The device of claim 1, wherein the evaluation means comprises an integrator circuit and the characterization means comprises a qualifier circuit, a segment of the sense signal applied to the integrator circuit being integrated, the resulting integral representing the impact energy of the interference, and the qualifier circuit characterizing the interference in response to the integral, and
   said evaluation means further includes a pre-qualifier circuit, the device being configured to operate in a manner such that if the sense signal satifies a noise threshold level within the pre-qualifier circuit, then the segment of the sense signal is passed by the pre-qualifier circuit to the integrator circuit, the qualifier circuit being configured to test the integral to determine whether the integral satisfies an interference energy threshold, and if so, to issue a qualification indication to characterize the interference as an interference of interest.

3. The device of claim 2, further including a full wave rectifier circuit and a bandpass filter designed to block frequencies in which interferences between the head and the disk do not tend to occur, the sense signal being applied to the pre-qualifier circuit via the filter and the full wave rectifier circuit.

4. The device of claim 3 wherein the filter passes a frequency range of approximately 100–300 KHz.

5. The device of claim 2, wherein the pre-qualifier circuit includes a window enable comparator circuit and a window circuit, the window enable comparator circuit outputting the sense signal, if the signal satisfies the noise threshold level, to the window circuit, to cause the sense signal segment to be applied to the integrator circuit.

6. The device of claim 5 wherein the window circuit issues a 20 $\mu$sec segment of the sense signal.

7. The device of claim 2 wherein the qualifier circuit includes an interference energy comparator and an interference of interest indicator, the interference energy comparator being disposed to compare an integrator circuit output to the interference energy threshold, and if this threshold is satisfied, to issue an output to the interference of interest indicator which in turn issues the qualification indication.

8. An interference detection device for use with a sensor, which sensor can detect an interference between a flying head and a disk and can emit a sense signal in response to the sensed interference, including
   a detector circuit comprising (1) a pre-qualifier circuit means for pre-qualifying an interference signal as a candidate interference signal of interest in view of a noise threshold level, and (2) a qualifier circuit means for qualifying a segment of the pre-qualified signal as an interference of interest in view of an impact energy threshold.

9. The device of claim 8, wherein the detector circuit is further configured to quantify the impact energy of the candidate signal and to qualify the interference as an interference of interest in view of that quantified impact energy.

10. The device of claim 9 wherein the detector circuit includes a candidate interference pre-qualifier circuit, an integrator circuit, and an interference of interest qualifier circuit, the detector circuit being configured to operate in a manner such that a segment of the sense signal which satisfies a noise threshold level is pre-qualified and passed by the pre-qualifier circuit, which includes a window circuit, to the integrator circuit, this segment is integrated, and the integrator circuit output is tested by the qualifier circuit to determine whether it satisfies an interference energy threshold, and if so, an output of the qualifier circuit is issued indicative of a qualified interference of interest between the flying head and the disk.

11. The device of claim 10 further including a full wave rectifier circuit, the sense signal from the sensor being applied to the rectifier circuit and an output of the rectifier circuit being applied to the window circuit.

12. A head/disk interference detection device including a circuit for receiving a sense signal from a transducer, the sense signal forming a curve when visually represented and having an area under the curve that represents impact energy of an interference between a head and a disk, for quantifying the energy of the interference between the head and disk by quantifying the area under the curve formed by the transducer sense signal, and for issuing an HDI detection signal based upon that quantified energy.

13. The device of claim 12 wherein the circuit includes
   a full wave rectifier,
   a window enable comparator,
   a window timer,
   an integrator,
   an interference energy comparator, and
   an interference of interest indicator,
   the sense signal being rectified by the rectifier and then applied to the window enable comparator, and if the rectified sense signal is over a noise threshold, then the window timer issuing a windowed interference signal, the integrator integrating the windowed interference signal and the integral thereof being applied to the interference energy comparator, this comparator causing the interference of interest indicator to issue an interference indication signal if the integral satisfies an interference energy threshold, such interference indication signal being availed to indicate an HDI between the head and disk.

14. The device of claim 13 wherein the windowed interference signal is about 20 $\mu$sec.

15. The device of claim 12 further including a high impedance amplifier, a full wave rectifier, and a bandpass filter designed to block frequencies in which interferences between the head and the disk do not tend to occur, the transducer signal being applied to the circuit for quantifying the energy of the interference via the amplifier, the filter, and the full wave rectifier.

16. The device of claim 15 wherein the filter passes a frequency range of the order of 100–300 KHz.

17. The device of claim 12 wherein the transducer is coupled to the head and is either piezoelectric or acoustic.

18. A method for characterizing an interference between a flying head and a hard disk, including receiving a transducer sense signal representing the interference, the transducer sense signal forming a curve when visually represented and having an area under the curve that represents impact energy of the interference between the head and the disk, quantifying the energy of the interference between the head and the disk by quantifying the area under the curve formed by the transducer sense signal, and qualifying the interference in view of the quantified energy.

19. A method of quantifying and qualifying an interference signal generated upon an interference between a flying head and a disk, said interference signal being generated by a transducer upon occurrence of such an interference, said method including (a) rectifying the interference signal, (b) issuing a windowed segment of the rectified interference signal if said rectified interference signal satisfies a noise threshold, (c) integrating the segment and presenting an integrated signal which quantifies the interference energy in the interference signal, (d) comparing the integrated signal to an interference energy threshold, and (e) issuing an interference indication if the integrated signal satisfies the interference energy threshold, so as to qualify the interference as an interference of interest.

20. In a system having a sensor which can detect an interference between a flying head and a disk and can emit a sense signal in response to the sensed interference, the sense signal forming a curve when visually represented and having an area under the curve that represents impact energy of the interference between the head and the disk, a method for qualifying a sensed interference as an interference of interest, including pre-qualifying a segment of the sense signal as a candidate interference signal to be isolated for further analysis and, based upon the area under the segment of the sense signal, qualifying the interference represented by the pre-qualified segment of the sense signal as an interference of interest.

* * * * *